(12) United States Patent
Liu (10) Patent No.: US 12,122,257 B1
(45) Date of Patent: Oct. 22, 2024

(54) ELECTRIC VEHICLE CHARGING CONTROL SYSTEM

(71) Applicant: Shenzhen Southking Technology Co., Ltd, Shenzhen (CN)

(72) Inventor: Xianxi Liu, Shenzhen (CN)

(73) Assignee: SHENZHEN SOUTHKING TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/597,148

(22) Filed: Mar. 6, 2024

(30) Foreign Application Priority Data

Mar. 27, 2023 (CN) .......................... 202310307418.6

(51) Int. Cl.
*B60L 53/60* (2019.01)
*B60L 53/62* (2019.01)
(Continued)

(52) U.S. Cl.
CPC ............... *B60L 53/62* (2019.02); *B60L 58/25* (2019.02); *B60L 53/60* (2019.02); *B60L 53/68* (2019.02);
(Continued)

(58) Field of Classification Search
CPC .... B60L 53/626; B60L 53/68; B60L 2240/10; B60L 2240/36; H01M 10/44;
(Continued)

(56) References Cited

U.S. PATENT DOCUMENTS

2007/0241721 A1\* 10/2007 Weinstein ........... H01M 50/213
320/114
2014/0140048 A1\* 5/2014 Miller .................. H02J 7/0068
362/183
(Continued)

FOREIGN PATENT DOCUMENTS

CA 3166311 A1 2/2022
CA 3196664 A1 5/2022
(Continued)

OTHER PUBLICATIONS

Brighente, Alessandro, et al. "Evscout2. 0: Electric vehicle profiling through charging profile." ACM Transactions on Cyber-Physical Systems 8.2 (2024): 1-24. (Year: 2024).\*
(Continued)

*Primary Examiner* — Cuong H Nguyen
(74) *Attorney, Agent, or Firm* — MUNCY, GEISSLER, OLDS & LOWE, P.C.

(57) ABSTRACT

An electric vehicle charging control system, comprising: an acquisition module, to obtain first power data of an output terminal of a power supply station and second power data of a charging terminal of an electric vehicle; a conversion module, configured to conduct power conversion analysis on the first power data and the second power data, and obtain first power conversion data; a judgment module, to judge whether the voltage data is less than a preset target voltage value; a processing module, configured to collect second power conversion data and conduct temperature difference analysis on the output terminal of the power supply station
(Continued)

and the charging terminal of the electric vehicle; and a control module, to control charging cycle of the output terminal of the power supply station and the charging terminal of the electric vehicle, and switch the output power supply of the output terminal of the power supply station.

7 Claims, 3 Drawing Sheets

(51) Int. Cl.
    *B60L 58/25*     (2019.01)
    *B60L 53/68*     (2019.01)
    *H01M 10/44*     (2006.01)

(52) U.S. Cl.
    CPC .......... *B60L 2240/36* (2013.01); *H01M 10/44* (2013.01); *Y02T 10/7072* (2013.01)

(58) Field of Classification Search
    CPC ............ H01J 7/00041; H03K 17/0806; H03K 2017/0806; H02M 1/327; Y02T 10/7072
    USPC .......................................................... 701/22
    See application file for complete search history.

(56) References Cited

U.S. PATENT DOCUMENTS

| | | | |
|---|---|---|---|
| 2017/0207637 A1 | 7/2017 | Sugeno et al. | |
| 2021/0053457 A1 | 2/2021 | Jeon et al. | |
| 2021/0309118 A1 | 10/2021 | Nanbu et al. | |
| 2021/0339640 A1 | 11/2021 | Yan et al. | |
| 2021/0380009 A1 | 12/2021 | Munemoto | |
| 2022/0289072 A1 | 9/2022 | Jeon | |
| 2023/0064263 A1 | 3/2023 | Li et al. | |
| 2023/0110777 A1* | 4/2023 | Neligan .............. | H01M 10/443 320/109 |

FOREIGN PATENT DOCUMENTS

| | | | | |
|---|---|---|---|---|
| CN | 107147198 A | | 9/2017 | |
| CN | 108839574 A | | 11/2018 | |
| CN | 110758127 A | | 2/2020 | |
| CN | 111319490 A | | 6/2020 | |
| CN | 111422098 A | | 7/2020 | |
| CN | 111559272 A | | 8/2020 | |
| CN | 111641239 A | | 9/2020 | |
| CN | 113844311 A | | 12/2021 | |
| CN | 113937389 A | * | 1/2022 | ............... B60L 1/00 |
| CN | 114050635 A | | 2/2022 | |
| CN | 115347591 A | | 11/2022 | |
| CN | 116198371 A | * | 6/2023 | ............. B60L 53/60 |
| JP | 2021078326 A | | 5/2021 | |
| KR | 102368324 B1 | | 3/2022 | |
| WO | WO-2019111872 A1 | | 6/2019 | |

OTHER PUBLICATIONS

Khalid, Mohd Rizwan, et al. "A comprehensive review on structural topologies, power levels, energy storage systems, and standards for electric vehicle charging stations and their impacts on grid." IEEE access 9 (2021): 128069-128094. (Year: 2021).*

Mahmud, Khizir, et al. "Integration of electric vehicles and management in the internet of energy." Renewable and Sustainable Energy Reviews 82 (2018): 4179-4203. (Year: 2018).*

W. Shuai et al "Charging Electric Vehicles in the Smart City: A Survey of Economy-Driven Approaches," in IEEE Transactions on Intelligent Transportation Systems, vol. 17, No. 8, pp. 2089-2106, Aug. 2016, doi: 10.1109/TITS.2016.2519499.. (Year: 2016).*

Zhu et al., "An Experimental Study on Overcharge Behaviors of Lithium-ion Power Batter with $LiNi_{0.6}Co_{0.2}Mn_{0.2}O_2$ Cathode," 2019, Automotive Engineering, vol. 41 No. 5, pp. 582-589, 8 pages.

\* cited by examiner

ELECTRIC VEHICLE CHARGING CONTROL SYSTEM

TECHNICAL FIELD

The present invention relates to the technical field of Internet of Things, especially an electric vehicle charging control system.

BACKGROUND TECHNOLOGY

Electric vehicles refer to vehicles powered by vehicle-mounted power supply and driven by a motor, which meet the requirements of road traffic and safety regulations. With the rapid development of electric vehicles, electric vehicles have gradually been widely used.

The known electric vehicle charging control systems cannot achieve intelligent control of the charging process of electric vehicles, which leads to inconvenience for people to use.

SUMMARY OF THE INVENTION

The present invention provides an electric vehicle charging control system for improving the control intelligence of the electric vehicle charging process. From a first aspect, the present invention provides an electric vehicle charging control method, comprising: obtaining a first power data of an output terminal of a preset power supply station, and obtaining a second power data of a preset charging terminal of an electric vehicle; conducting power conversion analysis on the first power data and the second power data, and obtaining a first power conversion data; conducting power supply conversion and voltage collection on the output terminal of the power supply station, obtaining a voltage data, and judging whether the voltage data is less than a preset target voltage value according to the first power conversion data; if so, collecting the second power conversion data corresponding to the output terminal of the power supply station and the charging terminal of the electric vehicle, and conducting temperature difference analysis on the output terminal of the power supply station and the charging terminal of the electric vehicle to obtain a temperature difference data according to the second power data; and controlling charging cycle of the output terminal of the power supply station and the charging terminal of the electric vehicle according to the temperature difference data, and switching the output power supply of the output terminal of the power supply station according to the preset power supply control strategy.

With reference to the first aspect, in a first embodiment of the first aspect of the present invention, conducting power conversion analysis on the first power data and the second power data and obtaining the first power conversion data comprising: comparing data features of the first power data and the second power data, and obtaining a comparison result of the power data; calculating target parameters corresponding to the first power data and the second power data according to the comparison result of the power data; conducting power conversion operation on the first power data, the second power data and the target parameters to obtain the first power conversion data.

With reference to the first aspect, in a second embodiment of the first aspect of the present invention, conducting power supply conversion and voltage collection on the output terminal of the power supply station, obtaining the voltage data, and judging whether the voltage data is less than the preset target voltage value according to the first power conversion data comprising: matching output power supply types of the first power conversion data to obtain a target output power supply type; conducting power supply conversion and voltage collection on the output terminal of the power supply station according to the target output power supply type to obtain the voltage data; and comparing the voltage data with the preset target voltage value, and judging whether the voltage data is less than the preset target voltage value.

With reference to the first aspect, in a third embodiment of the first aspect of the present invention, comparing the voltage data with the preset target voltage value, and judging whether the voltage data is less than the preset target voltage value comprising: correlating the voltage data with a preset power monitoring assembly, and recording the voltage data through the power monitoring assembly; setting a preset target voltage value of the power monitoring assembly; and comparing the voltage data with the preset target voltage value, and judging whether the voltage data is less than the preset target voltage value.

With reference to the first aspect, in a fourth embodiment of the first aspect of the present invention, if the voltage data is less than the preset target voltage value, collecting the second power conversion data corresponding to the output terminal of the power supply station and the charging terminal of the electric vehicle, and conducting temperature difference analysis on the output terminal of the power supply station and the charging terminal of the electric vehicle to obtain a temperature difference data according to the second power data, comprising: if the voltage data is less than the preset target voltage value, collecting and calculating the power data of the output terminal of the power supply station and the charging terminal of the electric vehicle to obtain a second power conversion data; obtaining a first attribute value of the output terminal of the power supply station and a second attribute value of the charging terminal of the electric vehicle according to the second power conversion data; and conducting temperature difference analysis on the output terminal of the power supply station and the charging terminal of the electric vehicle to obtain a temperature difference data according to the first attribute value and the second attribute value.

With reference to the first aspect, in a fifth embodiment of the first aspect of the present invention, selecting a power supply control strategy according to the target temperature range, and switching the output power supply of the output terminal of the power supply station according to the power supply control strategy, comprising: when the target temperature range is less than a first target threshold value, selecting a first power supply control strategy; generating a first control instruction according to the first power supply control strategy, and switching the output terminal of the power supply station to a first power supply according to the first control instruction; and when the target temperature range is less than a second target threshold value, selecting a second power supply control strategy, generating a second control instruction according to the second power supply control strategy, and switching the output terminal of the power supply station to a second power supply according to the second control instruction.

From a second aspect, the present invention provides an electric vehicle charging control system, comprising:

An acquisition module, configured to obtain a first power data of an output terminal of a power supply station and a second power data of a charging terminal of an electric vehicle;

A conversion module, configured to conduct power conversion analysis on the first power data and the second power data, and obtain a first power conversion data; A judgment module, configured to conduct power supply conversion and voltage collection on the output terminal of the power supply station, obtain a voltage data, and judge whether the voltage data is less than a preset target voltage value according to the first power conversion data;

A processing module, if the voltage data is less than the preset target voltage value, configured to collect the second power conversion data corresponding to the output terminal of the power supply station and the charging terminal of the electric vehicle, and conduct temperature difference analysis on the output terminal of the power supply station and the charging terminal of the electric vehicle to obtain a temperature difference data according to the second power data;

A control module, configured to control charging cycle of the output terminal of the power supply station and the charging terminal of the electric vehicle according to the temperature difference data, and switch the output power supply of the output terminal of the power supply station according to the preset power supply control strategy.

With reference to the second aspect, in a first embodiment of the second aspect of the present invention, the conversion module is specifically configured to: compare data features of the first power data and the second power data, and obtain a comparison result of the power data; calculate target parameters corresponding to the first power data and the second power data according to the comparison result of the power data; and conduct power conversion operation on the first power data, the second power data and the target parameters to obtain the first power conversion data.

With reference to the second aspect, in a second embodiment of the second aspect of the present invention, the judgment module comprises: a matching unit, configured to match output power supply types of the first power conversion data to obtain a target output power supply type; an acquisition unit, configured to conduct power supply conversion and voltage collection on the output terminal of the power supply station according to the target output power supply type to obtain the voltage data; and a comparison unit, configured to compare the voltage data with the preset target voltage value, and judge whether the voltage data is less than the preset target voltage value.

With reference to the second aspect, in a third embodiment of the second aspect of the present invention, the comparison unit is specifically configured to: correlate the voltage data with a preset power monitoring assembly, and record the voltage data through the power monitoring assembly; set a preset target voltage value of the power monitoring assembly; and compare the voltage data with the preset target voltage value, and judge whether the voltage data is less than the preset target voltage value. With reference to the second aspect, in a fourth embodiment of the second aspect of the present invention, if the voltage data is less than the preset target voltage value, the processing module is specifically configured to: collect and calculate the power data of the output terminal of the power supply station and the charging terminal of the electric vehicle to obtain a second power conversion data; obtain a first attribute value of the output terminal of the power supply station and a second attribute value of the charging terminal of the electric vehicle according to the second power conversion data; and conduct temperature difference analysis on the output terminal of the power supply station and the charging terminal of the electric vehicle to obtain a temperature difference data according to the first attribute value and the second attribute value.

With reference to the second aspect, in a fifth embodiment of the second aspect of the present invention, the control module comprises: an uploading unit, configured to upload the temperature difference data to a preset monitoring cloud platform; a dividing unit, configured to divide the temperature difference data into temperature ranges to obtain a target temperature range; a circulation unit, configured to control charging cycle of the output terminal of the power supply station and the charging terminal of the electric vehicle according to the target temperature range; and a selection unit, configured to select a power supply control strategy according to the target temperature range, and switch the output power supply of the output terminal of the power supply station according to the power supply control strategy.

With reference to the second aspect, in a sixth embodiment of the second aspect of the present invention, the selection unit is specifically configured to: select a first power supply control strategy when the target temperature range is less than a first target threshold value; generate a first control instruction according to the first power supply control strategy, and switch the output terminal of the power supply station to a first power supply according to the first control instruction; and when the target temperature range is less than a second target threshold value, select a second power supply control strategy, generate a second control instruction according to the second power supply control strategy, and switch the output terminal of the power supply station to a second power supply according to the second control instruction.

In the technical solution provided by the present invention, obtaining a first power data of an output terminal of a preset power supply station, and obtaining a second power data of a preset charging terminal of an electric vehicle; conducting power conversion analysis on the first power data and the second power data, and obtaining a first power conversion data; conducting power supply conversion and voltage collection on the output terminal of the power supply station, obtaining a voltage data, and judging whether the voltage data is less than a preset target voltage value according to the first power conversion data; if so, collecting the second power conversion data corresponding to the output terminal of the power supply station and the charging terminal of the electric vehicle, and conducting temperature difference analysis on the output terminal of the power supply station and the charging terminal of the electric vehicle to obtain a temperature difference data according to the second power data; and controlling charging cycle of the output terminal of the power supply station and the charging terminal of the electric vehicle according to the temperature difference data, and switching the output power supply of the output terminal of the power supply station according to the preset power supply control strategy. According to the present invention, the output terminal of the power supply station and the charging terminal of the electric vehicle are respectively subjected to power conversion detection, and the corresponding control strategy is adopted to control the charging process, which realizes the intelligent power supply switching in the electric vehicle charging process, and further improves the control intelligence of the electric vehicle charging process.

EMBODIMENTS

An embodiment of the present invention provides an electric vehicle charging control system for improving the control intelligence of the electric vehicle charging process.

Terms "first", "second", "third", "fourth" and so on (if any) in the description and claims of the present invention are used to distinguish similar objects, and are not necessarily used to describe a specific order or sequence. It shall be note that the data so used can be interchanged under appropriate circumstances, so that the embodiments described herein can be implemented in other orders than those illustrated or described herein. Furthermore, terms "comprising" or "having" and any variations thereof are intended to cover non-exclusive inclusion. For example, a process, method, system, product or equipment that comprises a series of steps or units is not necessarily limited to those explicitly listed, but may comprise other steps or units that are not explicitly listed or inherent to the process, method, system, product or equipment.

Figure 1:
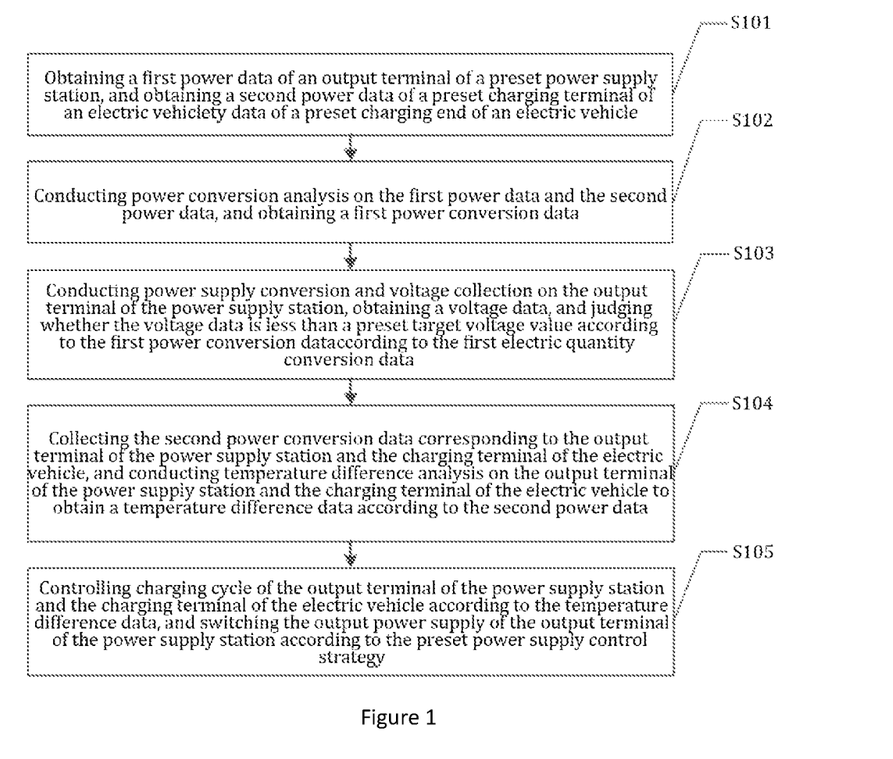
FIG. 1 is a diagram showing an embodiment of an electric vehicle charging control method according to an embodiment of the present invention.

Hereinafter, for ease of understanding, a specific flow of the embodiment of the present invention will be described. Referring to FIG. 1, one embodiment of an electric vehicle charging control method according to the embodiment of the present invention comprises:

Step S101, obtaining a first power data of an output terminal of a preset power supply station, and obtaining a second power data of a preset charging terminal of an electric vehicle;

It can be understood that an executive body of the present invention can be an electric vehicle charging control system, and can also be a terminal or a server, which is not specifically limited herein. The embodiment of the present invention takes the server as the execution subject as an example to illustrate.

Specifically, the server analyzes the data interface of the power supply station in advance to determine the corresponding data interface of the power supply station, further, the server collects data according to the data interface of the power supply station to obtain the first power data corresponding to the output terminal of the power supply station, and then the server determines the network communication protocol of the electric vehicle to obtain the corresponding target communication protocol, and finally the server determines the second power data corresponding to the charging terminal of the electric vehicle according to the target communication protocol.

Step S102, conducting power conversion analysis on the first power data and the second power data, and obtaining a first power conversion data;

Specifically, the server respectively extracts the power data from the first power data and the second power data to determine the first power corresponding to the first power data and the second power corresponding to the second power data. Further, the server compares the first power and the second power to determine the corresponding data comparison result. It shall be noted that the data comparison result comprises the power data difference and the power conversion rate. Finally, the server determines the corresponding target parameters through the data comparison result, wherein the target parameters comprise the voltage data, the power data and the power conversion rate, and finally the server conducts power conversion operation on the first power data, the second power data according to the target parameters to determine the corresponding first power conversion data.

Step S103, conducting power supply conversion and voltage collection on the output terminal of the power supply station, obtaining a voltage data, and judging whether the voltage data is less than a preset target voltage value according to the first power conversion data;

It shall be noted that the server filters the first power conversion data and converts the first power conversion data into corresponding voltage data output by the power supply station, and then the server judges whether the voltage data is less than the preset target voltage value. It shall be noted that the preset target voltage value is a target voltage value obtained by manual calculation based on various situations in advance.

Step S104, if the voltage data is less than the preset target voltage value, collecting the second power conversion data corresponding to the output terminal of the power supply station and the charging terminal of the electric vehicle, and conducting temperature difference analysis on the output terminal of the power supply station and the charging terminal of the electric vehicle to obtain a temperature difference data according to the second power data;

Specifically, if the voltage data is less than the preset target voltage value, collecting the second power conversion data corresponding to the output terminal of the power supply station and the charging terminal of the electric vehicle, wherein the server analyzes the attribute value of the power supply station on the second power conversion data to determine the first attribute value, and meanwhile conducting temperature difference analysis on the charging terminal of the electric vehicle to determine the second attribute value, and further, the server conducts temperature difference analysis according to the first attribute value and the second attribute value to obtain the temperature difference data.

Step S105, controlling charging cycle of the output terminal of the power supply station and the charging terminal of the electric vehicle according to the temperature difference data, and switching the output power supply of the output terminal of the power supply station according to the preset power supply control strategy.

Specifically, uploading the temperature difference data to a preset monitoring cloud platform, dividing the temperature difference data into temperature ranges to obtain a target temperature range, controlling charging cycle of the output terminal of the power supply station and the charging terminal of the electric vehicle according to the target temperature range, selecting a power supply control strategy according to the target temperature range, and switching the output power supply of the output terminal of the power supply station according to the power supply control strategy. In the embodiment of the present invention, obtaining a first power data of an output terminal of a preset power supply station, and obtaining a second power data of a preset charging terminal of an electric vehicle; conducting power conversion analysis on the first power data and the second power data, and obtaining a first power conversion data; conducting power supply conversion and voltage collection on the output terminal of the power supply station, obtaining a voltage data, and judging whether the voltage data is less than a preset target voltage value according to the first power conversion data; if so, collecting the second power conversion data corresponding to the output terminal of the power supply station and the charging terminal of the electric vehicle, and conducting temperature difference analysis on the output terminal of the power supply station and the charging terminal of the electric vehicle to obtain a temperature difference data according to the second power data; and controlling charging cycle of the output terminal of the power supply station and the charging terminal of the electric vehicle according to the temperature difference data, and switching the output power supply of the output terminal of the power supply station according to the preset power supply control strategy. According to the present invention, the output terminal of the power supply station and the charging terminal of the electric vehicle are respectively subjected to power conversion detection, and the corresponding control strategy is adopted to control the charging process, which realizes the intelligent power supply switching in the electric vehicle charging process, and further improves the control intelligence of the electric vehicle charging process.

In one specific embodiment, the process of executing step S102 specifically comprises the following steps:

(1) Comparing data features of the first power data and the second power data, and obtaining a comparison result of the power data;

(2) Calculating target parameters corresponding to the first power data and the second power data according to the comparison result of the power data;

(3) Conducting power conversion operation on the first power data, the second power data and the target parameters to obtain the first power conversion data.

Specifically, the server extracts a data condition code from the first power data to obtain a first data condition code, and further, the server generates a first condition code file according to the first data condition code, and further, the server extracts a data condition code from the second power data to obtain a second data condition code, and further, the server generates a second condition code file according to the second data condition code, and finally the server conducts data feature comparison according to the first condition code file and the second condition code file to obtain the comparison result of the power data, and further, the server calculates the target parameters corresponding to the first power data and the second power data according to the comparison result of the power data, and conducts power conversion operation on the first power data, the second power data and the target parameters to obtain the first power conversion data.

Figure 2:
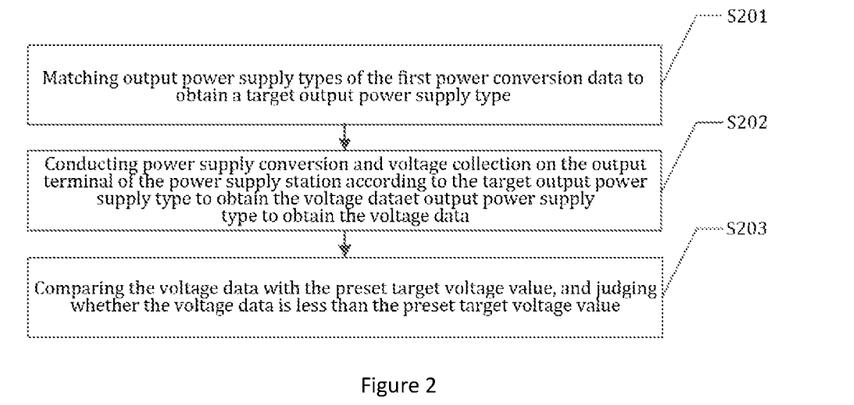
FIG. 2 is a flow chart for judging whether a voltage data is less than a preset target voltage value according to an embodiment of the present invention.

In one specific embodiment, as shown in FIG. 2, the process of executing step S103 specifically comprises the following steps:

Step S201, matching output power supply types of the first power conversion data to obtain a target output power supply type;

Step S202, conducting power supply conversion and voltage collection on the output terminal of the power supply station according to the target output power supply type to obtain the voltage data; and Step S203, comparing the voltage data with the preset target voltage value, and judging whether the voltage data is less than the preset target voltage value.

Specifically, the server matches the output power supply types of the first power conversion data, wherein the server analyzes the load fluctuation pattern of the first power conversion data, summarizes the load characteristics in different periods, and further the server matches the power types according to the load characteristics to obtain the target output power supply type, and further, the server conducts power supply conversion and voltage collection on the output terminal of the power supply station according to the target output power supply type to obtain the voltage data, compares the voltage data with the preset target voltage value, and judges whether the voltage data is less than the preset target voltage value. It shall be noted that the preset target voltage value is a target voltage value obtained by manual calculation based on various situations in advance.

Figure 3:
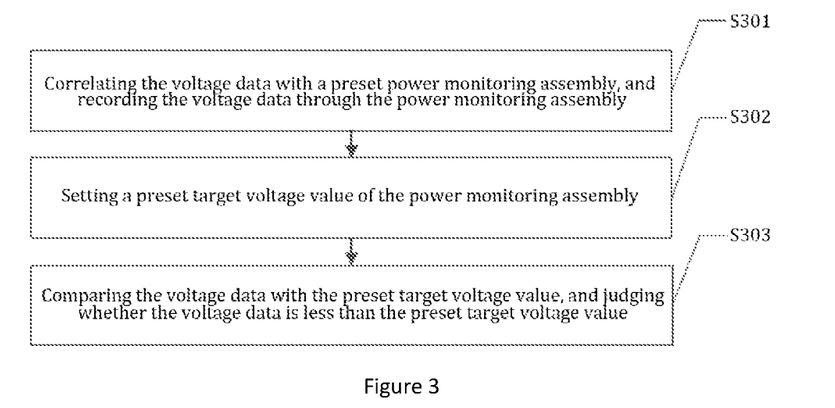
FIG. 3 is a flow chart for comparing the voltage data with a preset target voltage value according to an embodiment of the present invention.

In one specific embodiment, as shown in FIG. 3, the process of executing step S203 specifically comprises the following steps:

Step S301, correlating the voltage data with a preset power monitoring assembly, and recording the voltage data through the power monitoring assembly;

Step S302, setting a preset target voltage value of the power monitoring assembly; and Step S303, comparing the voltage data with the preset target voltage value, and judging whether the voltage data is less than the preset target voltage value.

Specifically, the server codes and analyzes the voltage data to determine the corresponding voltage data code, and further, the server obtains an internal code corresponding to the power monitoring assembly, and further, the server correlates the voltage data with a preset power monitoring assembly and records the voltage data through the power monitoring assembly according to the voltage data code and the internal code corresponding to the power monitoring assembly, and further, the server sets a preset target voltage value of the power monitoring assembly, compares the voltage data with the preset target voltage value, and judges whether the voltage data is less than the preset target voltage value.

Figure 4:
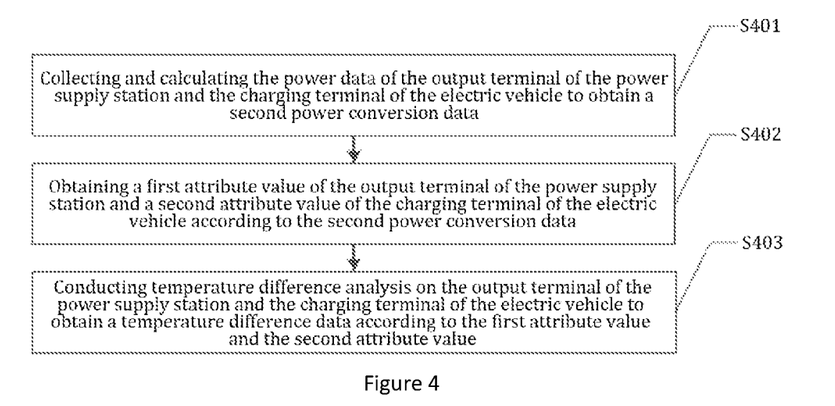
FIG. 4 is a flow chart showing temperature difference analysis on an output terminal of a power supply station and a charging terminal of the electric vehicle according to an embodiment of the present invention.

In one specific embodiment, as shown in FIG. 4, the process of executing step S104 specifically comprises the following steps:

Step S401, if the voltage data is less than the preset target voltage value, collecting and calculating the power data of the output terminal of the power supply station and the charging terminal of the electric vehicle to obtain a second power conversion data; Step S402, obtaining a first attribute value of the output terminal of the power supply station and a second attribute value of the charging terminal of the electric vehicle according to the second power conversion data;

Step S403, conducting temperature difference analysis on the output terminal of the power supply station and the charging terminal of the electric vehicle to obtain a temperature difference data according to the first attribute value and the second attribute value.

Specifically, the server collects and calculates the power data of the output terminal of the power supply station and the charging terminal of the electric vehicle to obtain a second power conversion data, further, obtains a first attribute value of the output terminal of the power supply station and a second attribute value of the charging terminal of the electric vehicle according to the second power conversion data, and finally, establishing a temperature difference analysis model by the server, inputting the first attribute value and the second attribute value, calculating the coefficient of heat transfer, and calculating the Nusselt number without considering the temperature difference change according to the coefficient of heat transfer, establishing the function of system pressure and time, conducting temperature difference analysis on the output terminal of the power supply station and the charging terminal of the electric vehicle to obtain a temperature difference data according to the established function of system pressure and time.

In one specific embodiment, the process of executing step S105 specifically comprises the following steps:
(1) Uploading the temperature difference data to a preset monitoring cloud platform;
(2) Dividing the temperature difference data into temperature ranges to obtain a target temperature range;
(3) Controlling charging cycle of the output terminal of the power supply station and the charging terminal of the electric vehicle according to the target temperature range;
(4) Selecting a power supply control strategy according to the target temperature range, and switching the output power supply of the output terminal of the power supply station according to the power supply control strategy;

Specifically, uploading the temperature difference data to the preset monitoring cloud platform, and further the server calculates the difference value of the preset average temperature data according to the temperature difference data, so as to complete the division of the temperature difference data into temperature ranges to obtain a target temperature range, and further, the server controls charging cycle of the output terminal of the power supply station and the charging terminal of the electric vehicle according to the target temperature range, selects a power supply control strategy according to the target temperature range, and switches the output power supply of the output terminal of the power supply station according to the power supply control strategy.

In one specific embodiment, the process of selecting the power supply control strategy according to the target temperature range and switching the output power supply of the output terminal of the power supply station according to the power supply control strategy specifically comprises the following steps:
(1) When the target temperature range is less than a first target threshold value, selecting a first power supply control strategy;
(2) Generating a first control instruction according to the first power supply control strategy, and switching the output terminal of the power supply station to a first power supply according to the first control instruction; and
(3) When the target temperature range is less than a second target threshold value, selecting a second power supply control strategy, generating a second control instruction according to the second power supply control strategy, and switching the output terminal of the power supply station to a second power supply according to the second control instruction.

Specifically, when the target temperature range is less than a first target threshold value, selecting a first power supply control strategy, wherein, when the server selects a power supply control strategy, the server conducts strategy matching on a preset power control strategy library in advance, and when the target temperature range is less than the first target threshold value, the server determines the corresponding power supply control strategy, and further, the server generates instructions for the power supply control strategy, wherein, when the instructions are generated, the server analyzes the key field of the power supply control strategy to determine the corresponding target key field, and further the server generates the instructions according to the target key field, switches the output terminal of the power supply station to the first power supply according to the first control instruction, and when the target temperature range is less than the second target threshold value, selects the second power supply control strategy, generates the second control instruction according to the second power supply control strategy, and switches the output terminal of the power supply station to a second power supply according to the second control instruction.

Figure 5:
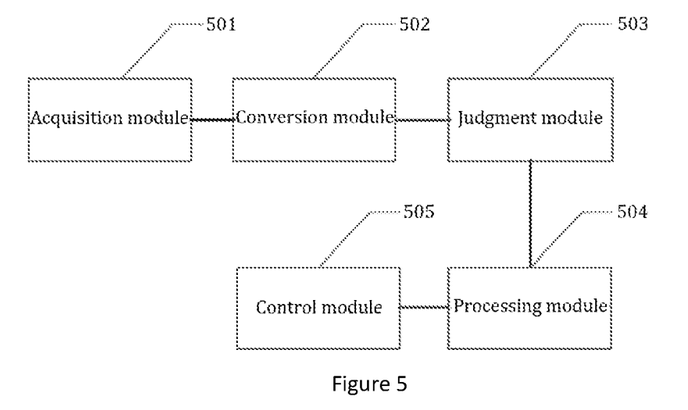
FIG. 5 is a diagram showing an embodiment of an electric vehicle charging control system according to an embodiment of the present invention.

The electric vehicle charging control method in the embodiment of the present invention has been described above, and hereinafter, an electric vehicle charging control system in the embodiment of the present invention will be described. Referring to FIG. 5, one embodiment of the electric vehicle charging control system according to the embodiment of the present invention comprises:

An acquisition module 501, configured to obtain a first power data of an output terminal of a power supply station and a second power data of a charging terminal of an electric vehicle;

A conversion module 502, configured to conduct power conversion analysis on the first power data and the second power data, and obtain a first power conversion data; A judgment module 503, configured to conduct power supply conversion and voltage collection on the output terminal of the power supply station, obtain a voltage data, and judge whether the voltage data is less than a preset target voltage value according to the first power conversion data;

A processing module 504, if the voltage data is less than the preset target voltage value, configured to collect the second power conversion data corresponding to the output terminal of the power supply station and the charging terminal of the electric vehicle, and conduct temperature difference analysis on the output terminal of the power supply station and the charging terminal of the electric vehicle to obtain a temperature difference data according to the second power data;

A control module 505, configured to control charging cycle of the output terminal of the power supply station and the charging terminal of the electric vehicle according to the temperature difference data, and switch the output power supply of the output terminal of the power supply station according to the preset power supply control strategy.

Through cooperation of the above assemblys, obtaining a first power data of an output terminal of a preset power supply station, and obtaining a second power data of a preset charging terminal of an electric vehicle; conducting power conversion analysis on the first power data and the second power data, and obtaining a first power conversion data; conducting power supply conversion and voltage collection on the output terminal of the power supply station, obtaining a voltage data, and judging whether the voltage data is less than a preset target voltage value according to the first power conversion data; if so, collecting the second power conversion data corresponding to the output terminal of the power supply station and the charging terminal of the electric vehicle, and conducting temperature difference analysis on the output terminal of the power supply station and the charging terminal of the electric vehicle to obtain a temperature difference data according to the second power data; and controlling charging cycle of the output terminal of the power supply station and the charging terminal of the electric vehicle according to the temperature difference data, and switching the output power supply of the output terminal of the power supply station according to the preset power supply control strategy. According to the present invention, the output terminal of the power supply station and the charging terminal of the electric vehicle are respectively subjected to power conversion detection, and the corresponding control strategy is adopted to control the charging process, which realizes the intelligent power supply switching in the electric vehicle charging process, and further improves the control intelligence of the electric vehicle charging process.

Figure 6:
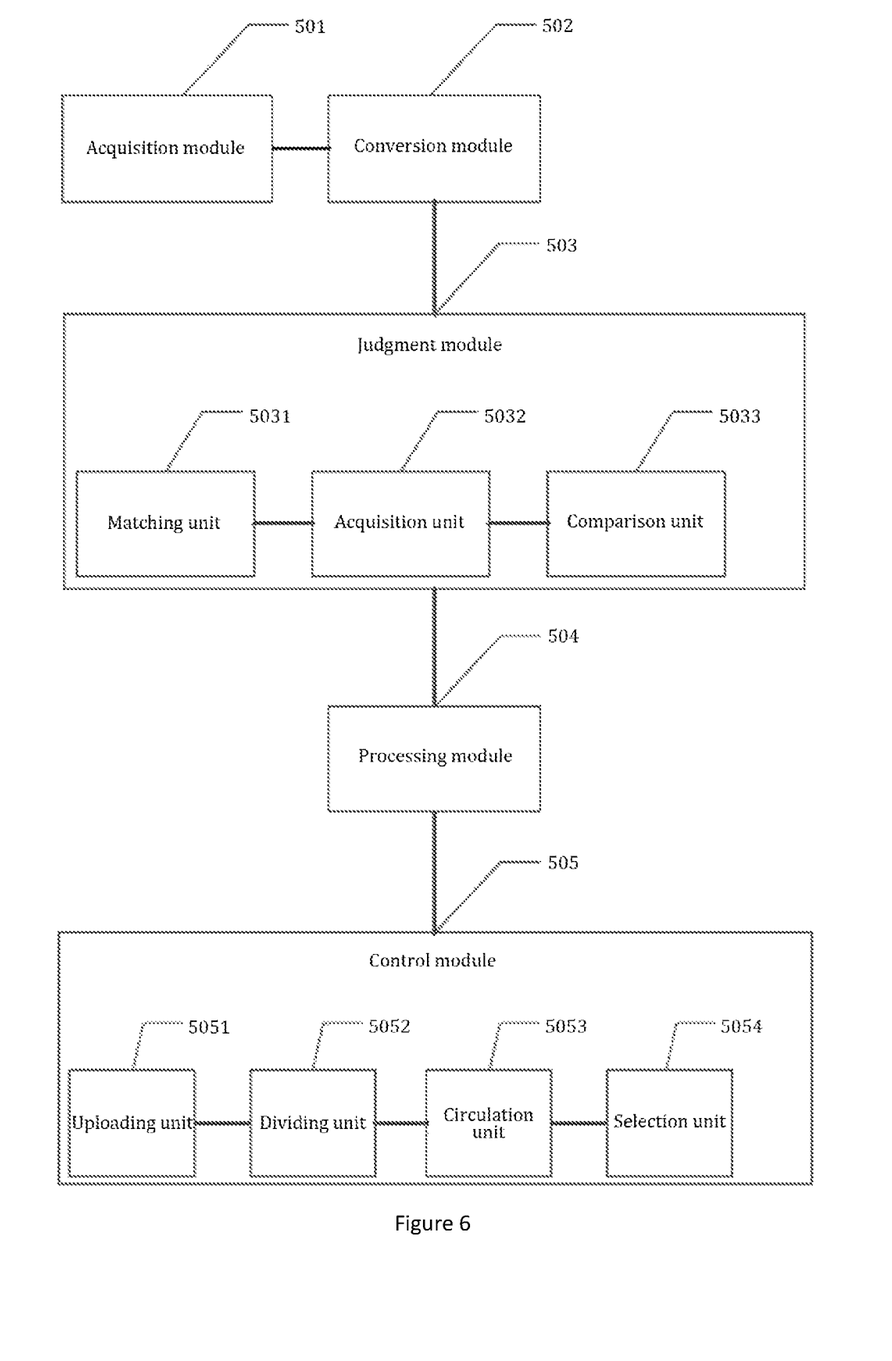
FIG. 6 is another diagram showing an embodiment of the electric vehicle charging control system according to an embodiment of the present invention.

Referring to FIG. 6, another embodiment of the charging control system for electric vehicles according to the embodiment of the present invention comprises:

An acquisition module 501, configured to obtain a first power data of an output terminal of a power supply station and a second power data of a charging terminal of an electric vehicle;

A conversion module 502, configured to conduct power conversion analysis on the first power data and the second power data, and obtain a first power conversion data;

A judgment module 503, configured to conduct power supply conversion and voltage collection on the output terminal of the power supply station, obtain a voltage data, and judge whether the voltage data is less than a preset target voltage value according to the first power conversion data;

A processing module 504, if the voltage data is less than the preset target voltage value, configured to collect the second power conversion data corresponding to the output terminal of the power supply station and the charging terminal of the electric vehicle, and conduct temperature difference analysis on the output terminal of the power supply station and the charging terminal of the electric vehicle to obtain a temperature difference data according to the second power data;

A control module 505, configured to control charging cycle of the output terminal of the power supply station and the charging terminal of the electric vehicle according to the temperature difference data, and switch the output power supply of the output terminal of the power supply station according to the preset power supply control strategy.

Alternatively, the conversion module 502 is specifically configured to:
  Compare data features of the first power data and the second power data, and obtain a comparison result of the power data;
  Calculate target parameters corresponding to the first power data and the second power data according to the comparison result of the power data;
  Conduct power conversion operation on the first power data, the second power data and the target parameters to obtain the first power conversion data.

Alternatively, the judgment module 503 further comprises:
  A matching unit 5031, configured to match output power supply types of the first power conversion data to obtain a target output power supply type;
  An acquisition unit 5032, configured to conduct power supply conversion and voltage collection on the output terminal of the power supply station according to the target output power supply type to obtain the voltage data;
  A comparison unit 5033, configured to compare the voltage data with the preset target voltage value, and judge whether the voltage data is less than the preset target voltage value.

Alternatively, the comparison unit 5033 is specifically configured to:
  Correlate the voltage data with a preset power monitoring assembly, and record the voltage data through the power monitoring assembly; set a preset target voltage value of the power monitoring assembly; and compare the voltage data with the preset target voltage value, and judge whether the voltage data is less than the preset target voltage value.

Alternatively, the processing module 504 is specifically configured to:
  If the voltage data is less than the preset target voltage value, collect and calculate the power data of the output terminal of the power supply station and the charging terminal of the electric vehicle to obtain a second power conversion data; obtain a first attribute value of the output terminal of the power supply station and a second attribute value of the charging terminal of the electric vehicle according to the second power conversion data; and conduct temperature difference analysis on the output terminal of the power supply station and the charging terminal of the electric vehicle to obtain a temperature difference data according to the first attribute value and the second attribute value.

Alternatively, the control module 505 further comprises:
  An uploading unit 5051, configured to upload the temperature difference data to a preset monitoring cloud platform;
  A dividing unit 5052, configured to divide the temperature difference data into temperature ranges to obtain a target temperature range;
  A circulation unit 5053, configured to control charging cycle of the output terminal of the power supply station and the charging terminal of the electric vehicle according to the target temperature range;
  A selection unit 5054, configured to select a power supply control strategy according to the target temperature range, and switch the output power supply of the output terminal of the power supply station according to the power supply control strategy.

Alternatively, the selection unit 5054 is specifically configured to:
  When the target temperature range is less than a first target threshold value, selecting a first power supply control strategy; generating a first control instruction according to the first power supply control strategy, and switching the output terminal of the power supply station to a first power supply according to the first control instruction; and when the target temperature range is less than a second target threshold value, selecting a second power supply control strategy, generating a second control instruction according to the second power supply control strategy, and switching the output terminal of the power supply station to a second power supply according to the second control instruction.

In the embodiment of the present invention, obtaining a first power data of an output terminal of a preset power supply station, and obtaining a second power data of a preset charging terminal of an electric vehicle; conducting power conversion analysis on the first power data and the second power data, and obtaining a first power conversion data; conducting power supply conversion and voltage collection on the output terminal of the power supply station, obtaining a voltage data, and judging whether the voltage data is less than a preset target voltage value according to the first power conversion data; if so, collecting the second power conversion data corresponding to the output terminal of the power supply station and the charging terminal of the electric vehicle, and conducting temperature difference analysis on the output terminal of the power supply station and the charging terminal of the electric vehicle to obtain a temperature difference data according to the second power data; and controlling charging cycle of the output terminal of the power supply station and the charging terminal of the electric vehicle according to the temperature difference data, and switching the output power supply of the output terminal of the power supply station according to the preset power supply control strategy. According to the present invention, the output terminal of the power supply station and the charging terminal of the electric vehicle are respectively subjected to power conversion detection, and the corresponding control strategy is adopted to control the charging process, which realizes the intelligent power supply switching in the electric vehicle charging process, and further improves the control intelligence of the electric vehicle charging process.

Those skilled in the art can clearly appreciate that, for the convenience and simplicity of description, the specific working processes of the systems, devices and units described above can be referred to the corresponding processes in the foregoing method embodiments, which will not be repeated here.

If the integrated unit is implemented in a form of a software functional unit and sold or used as an independent product, it may be stored in a computer-readable storage medium. Based on the understanding, technical solutions of the present invention, a part thereof contributing to the prior art, or all or part of the technical solutions can be embodied in a form of a software product. The computer software product is stored in a storage medium, comprising several instructions to cause a computer device (which may be a personal computer, a server, or a network device, etc.) to execute all or part of the steps of the methods described in various embodiments of the present invention. The aforementioned storage media comprises: U disks, mobile hard disks, read-only memory (ROM), random access memory (RAM), magnetic disks or optical disks and other media that can store program code.

As mentioned above, the above embodiments are only used to illustrate the technical solutions of the present invention, but not to limit them. Although the present invention has been described in detail with reference to the foregoing embodiments, those of ordinary skill in the art shall appreciate that, it is still possible to modify the technical solutions described in the foregoing embodiments, or to equivalently replace some technical features thereof; while these modifications or substitutions do not deviate from the essence of the corresponding technical solutions from the spirit and scope of the technical solutions of each embodiment of the present invention.

The invention claimed is:

1. An electric vehicle charging control method, comprising:
    obtaining a first power data of an output terminal of a preset power supply station, and obtaining a second power data of a preset charging terminal of an electric vehicle;
    conducting power conversion analysis on the first power data and the second power data, and obtaining a first power conversion data;
    conducting power supply conversion and voltage collection on the output terminal of the power supply station, obtaining a voltage data, and judging whether the voltage data is less than a preset target voltage value according to the first power conversion data;
    if so, collecting and calculating the power data of the output terminal of the power supply station and the charging terminal of the electric vehicle to obtain a second power conversion data; obtaining a first attribute value of the output terminal of the power supply station and a second attribute value of the charging terminal of the electric vehicle according to the second power conversion data; and conducting temperature difference analysis on the output terminal of the power supply station and the charging terminal of the electric vehicle to obtain a temperature difference data according to the first attribute value and the second attribute value; and
    uploading the temperature difference data to a preset monitoring cloud platform;
    dividing the temperature difference data into temperature ranges to obtain a target temperature range; controlling charging cycle of the output terminal of the power supply station and the charging terminal of the electric vehicle according to the target temperature range; selecting a power supply control strategy according to the target temperature range, and switching the output power supply of the output terminal of the power supply station according to the power supply control strategy; wherein, when the target temperature range is less than a first target threshold value, selecting a first power supply control strategy; generating a first control instruction according to the first power supply control strategy, and switching the output terminal of the power supply station to a first power supply according to the first control instruction; and when the target temperature range is less than a second target threshold value, selecting a second power supply control strategy, generating a second control instruction according to the second power supply control strategy, and switching the output terminal of the power supply station to a second power supply according to the second control instruction.

2. The electric vehicle charging control method according to claim 1, wherein conducting power conversion analysis on the first power data and the second power data and obtaining the first power conversion data comprising:
    comparing data features of the first power data and the second power data, and obtaining a comparison result of the power data;
    calculating target parameters corresponding to the first power data and the second power data according to the comparison result of the power data; and conducting power conversion operation on the first power data, the second power data and the target parameters to obtain the first power conversion data.

3. The electric vehicle charging control method according to claim 1, wherein conducting power supply conversion and voltage collection on the output terminal of the power supply station, obtaining the voltage data, and judging whether the voltage data is less than the preset target voltage value according to the first power conversion data comprising:
matching output power supply types of the first power conversion data to obtain a target output power supply type;
conducting power supply conversion and voltage collection on the output terminal of the power supply station according to the target output power supply type to obtain the voltage data; and
comparing the voltage data with the preset target voltage value, and judging whether the voltage data is less than the preset target voltage value.

4. The electric vehicle charging control method according to claim 3, wherein comparing the voltage data with the preset target voltage value, and judging whether the voltage data is less than the preset target voltage value comprising:
correlating the voltage data with a preset power monitoring assembly, and recording the voltage data through the power monitoring assembly;
setting a preset target voltage value of the power monitoring assembly; and
comparing the voltage data with the preset target voltage value, and judging whether the voltage data is less than the preset target voltage value.

5. An electric vehicle charging control system, comprising:
an acquisition module, configured to obtain a first power data of an output terminal of a power supply station and a second power data of a charging terminal of an electric vehicle;
a conversion module, configured to conduct power conversion analysis on the first power data and the second power data, and obtain a first power conversion data;
a judgment module, configured to conduct power supply conversion and voltage collection on the output terminal of the power supply station, obtain a voltage data, and judge whether the voltage data is less than a preset target voltage value according to the first power conversion data;
a processing module, if the voltage data is less than the preset target voltage value, configured to collect and calculate the power data of the output terminal of the power supply station and the charging terminal of the electric vehicle to obtain a second power conversion data; obtain a first attribute value of the output terminal of the power supply station and a second attribute value of the charging terminal of the electric vehicle according to the second power conversion data; conduct temperature difference analysis on the output terminal of the power supply station and the charging terminal of the electric vehicle to obtain a temperature difference data according to the first attribute value and the second attribute value; and
a control module, configured to upload the temperature difference data to a preset monitoring cloud platform; divide the temperature difference data into temperature ranges to obtain a target temperature range; control charging cycle of the output terminal of the power supply station and the charging terminal of the electric vehicle according to the target temperature range; select a power supply control strategy according to the target temperature range, and switch the output power supply of the output terminal of the power supply station according to the power supply control strategy; wherein, when the target temperature range is less than a first target threshold value, select a first power supply control strategy; generating a first control instruction according to the first power supply control strategy, and switch the output terminal of the power supply station to a first power supply according to the first control instruction; and when the target temperature range is less than a second target threshold value, select a second power supply control strategy, generate a second control instruction according to the second power supply control strategy, and switch the output terminal of the power supply station to a second power supply according to the second control instruction.

6. The electric vehicle charging control system according to claim 5, wherein the conversion module is specifically configured to:
compare data features of the first power data and the second power data, and obtain a comparison result of the power data;
calculate target parameters corresponding to the first power data and the second power data according to the comparison result of the power data;
conduct power conversion operation on the first power data, the second power data and the target parameters to obtain the first power conversion data.

7. The electric vehicle charging control system according to claim 5, wherein the judgment module comprises:
a matching unit, configured to match output power supply types of the first power conversion data to obtain a target output power supply type;
an acquisition unit, configured to conduct power supply conversion and voltage collection on the output terminal of the power supply station according to the target output power supply type to obtain the voltage data; and
a comparison unit, configured to compare the voltage data with the preset target voltage value, and judge whether the voltage data is less than the preset target voltage value.

* * * * *